US010059453B2

(12) United States Patent
Boyer, Jr. et al.

(10) Patent No.: US 10,059,453 B2
(45) Date of Patent: Aug. 28, 2018

(54) DETACHABLE SEAT MOUNTED AUDIO-VISUAL ENTERTAINMENT SYSTEM WITH LOCALLY STORABLE, SELECTABLE, AND UPDATABLE CONTENT

(71) Applicant: DIGECOR I.P. AND ASSETS PTY. LTD., West End, Queensland (AU)

(72) Inventors: William J. Boyer, Jr., Lakewood, WA (US); Robert Ray Henson, Spanaway, WA (US)

(73) Assignee: DIGECOR I.P. AND ASSETS PTY LTD., Brisbane (AU)

( * ) Notice: Subject to any disclaimer, the term of this patent is extended or adjusted under 35 U.S.C. 154(b) by 931 days.

(21) Appl. No.: 14/306,888

(22) Filed: Jun. 17, 2014

(65) Prior Publication Data

US 2014/0292047 A1   Oct. 2, 2014

Related U.S. Application Data

(63) Continuation of application No. 13/850,219, filed on Mar. 25, 2013, now abandoned, which is a
(Continued)

(51) Int. Cl.
| | |
|---|---|
| *H04N 7/18* | (2006.01) |
| *B64D 11/00* | (2006.01) |
| *B64D 11/06* | (2006.01) |
| *H04N 7/173* | (2011.01) |
| *H04N 21/214* | (2011.01) |

(Continued)

(52) U.S. Cl.
CPC ........ *B64D 11/00155* (2014.12); *B60R 11/02* (2013.01); *B64D 11/06* (2013.01); *B64D 11/0624* (2014.12); *B64D 11/0647* (2014.12); *G06Q 20/204* (2013.01); *H04N 7/17318* (2013.01); *H04N 21/2146* (2013.01); *H04N 21/222* (2013.01); *H04N 21/2543* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| D267,372 S | 12/1982 | Long et al. | |
| 4,647,980 A * | 3/1987 | Steventon | .......... B64D 11/0015 348/837 |

(Continued)

*Primary Examiner* — Jonathan V Lewis
(74) *Attorney, Agent, or Firm* — Fabian Vancott; Steven L. Nichols

(57) ABSTRACT

A detachable seat mounted audio-visual entertainment system. The system has locally storable, selectable, and updatable content. The passenger in-flight entertainment device terminal has passenger selectable controls, a video display, an audio output, storage media such as a magnetic or "hard disk", and a payment interface device such as a card swipe, all located in a seat which has been wired with power, local network, and audio wiring. A local, transport vehicle mounted local host computer provides supports the local network, and may be used to collect revenue slips resulting from passenger input to the payment interface device. Revenue slips may be posted to a remote server during a trip segment via satellite or direct radio frequency communication to receiving facilities providing connection to the internet, or alternately collected and posted batchwise.

25 Claims, 8 Drawing Sheets

Related U.S. Application Data continuation of application No. 10/737,531, filed on Dec. 15, 2003, now Pat. No. 8,403,411.

(51) Int. Cl.
*H04N 21/222* (2011.01)
*H04N 21/2543* (2011.01)
*B60R 11/02* (2006.01)
*G06Q 20/20* (2012.01)

(56) References Cited

U.S. PATENT DOCUMENTS

| | | | |
|---|---|---|---|
| 5,023,125 A | 6/1991 | Gray | |
| 5,529,265 A | 6/1996 | Sakurai | |
| 5,803,539 A | 9/1998 | Dewar et al. | |
| 6,241,188 B1 | 6/2001 | Simpson et al. | |
| 6,499,027 B1 | 12/2002 | Weinberger | |
| 6,526,335 B1 * | 2/2003 | Treyz | G01C 21/26 307/10.1 |
| 6,584,450 B1 | 6/2003 | Hastings et al. | |
| 6,669,285 B1 | 12/2003 | Park et al. | |
| 6,757,712 B1 * | 6/2004 | Bastian | B64D 11/0015 709/203 |
| 6,817,664 B1 | 11/2004 | Tang et al. | |
| 6,905,167 B2 | 6/2005 | Jost | |
| 6,994,236 B2 | 2/2006 | Hsu | |
| 7,048,163 B2 | 5/2006 | Albert et al. | |
| 7,181,199 B2 * | 2/2007 | Sorrells | H03D 7/00 455/131 |
| 7,188,895 B1 * | 3/2007 | Espina | B60N 2/643 297/217.3 |
| 7,597,393 B1 * | 10/2009 | Tuccinardi | B60R 11/0211 297/188.04 |
| 7,660,728 B2 * | 2/2010 | Halavais | G06Q 10/02 705/5 |
| 8,135,773 B2 * | 3/2012 | Stopniewicz | H04N 21/2146 709/203 |
| 9,026,471 B2 * | 5/2015 | Pappas | G06Q 30/0633 705/26.25 |
| 9,317,241 B2 * | 4/2016 | Tranchina | G06F 3/1423 |
| 2003/0041155 A1 * | 2/2003 | Nelson | H04B 7/18506 709/230 |
| 2003/0107248 A1 * | 6/2003 | Sanford | B64D 11/06 297/217.3 |
| 2003/0192052 A1 * | 10/2003 | Frisco | G06Q 30/02 725/76 |
| 2003/0208579 A1 * | 11/2003 | Brady, Jr. | G06F 8/65 709/223 |
| 2003/0217363 A1 * | 11/2003 | Brady, Jr. | H04L 29/06 725/76 |
| 2003/0226148 A1 * | 12/2003 | Ferguson | B60R 11/0211 725/75 |
| 2003/0229900 A1 * | 12/2003 | Reisman | G06F 17/30873 725/87 |
| 2004/0097288 A1 * | 5/2004 | Sloate | A63F 13/12 463/42 |
| 2004/0186760 A1 * | 9/2004 | Metzger | G06Q 10/087 705/28 |
| 2005/0055278 A1 * | 3/2005 | Boyer, Jr. | B64D 11/0015 705/17 |

* cited by examiner

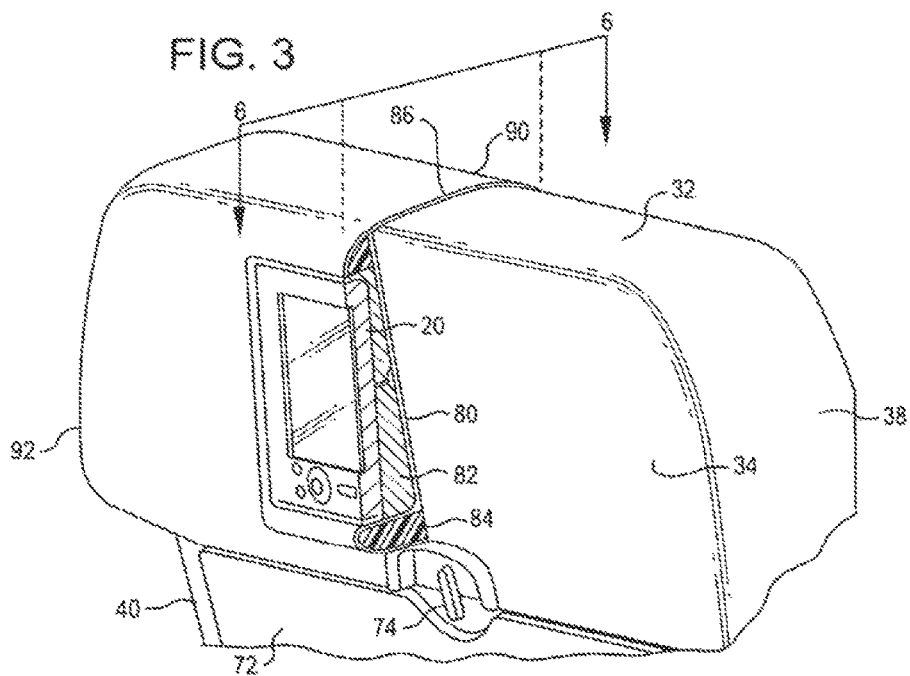
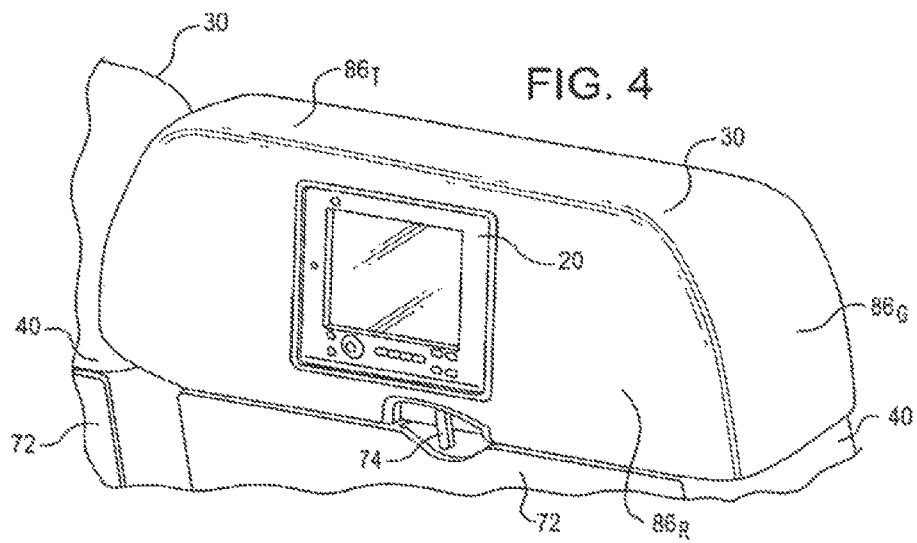

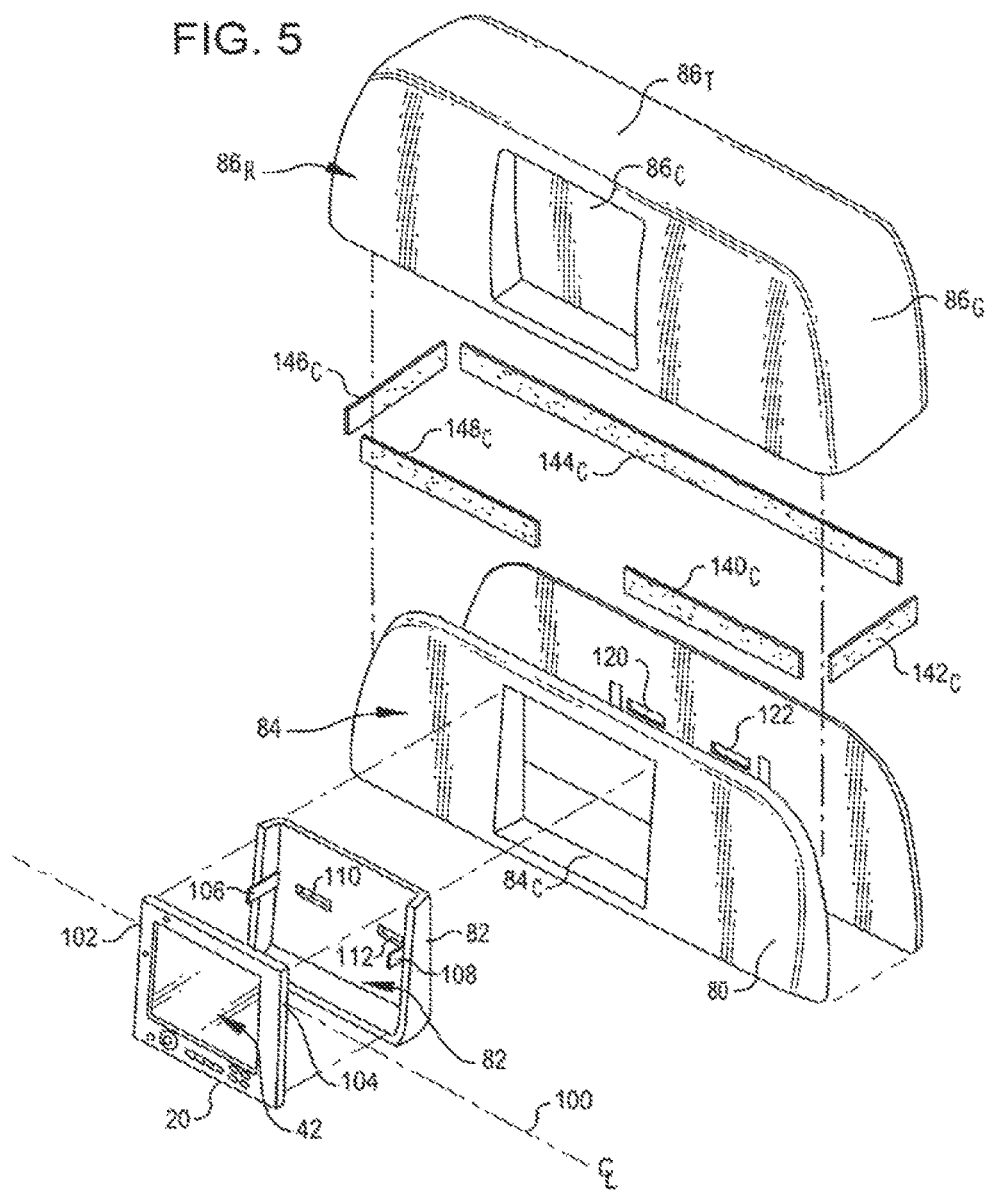

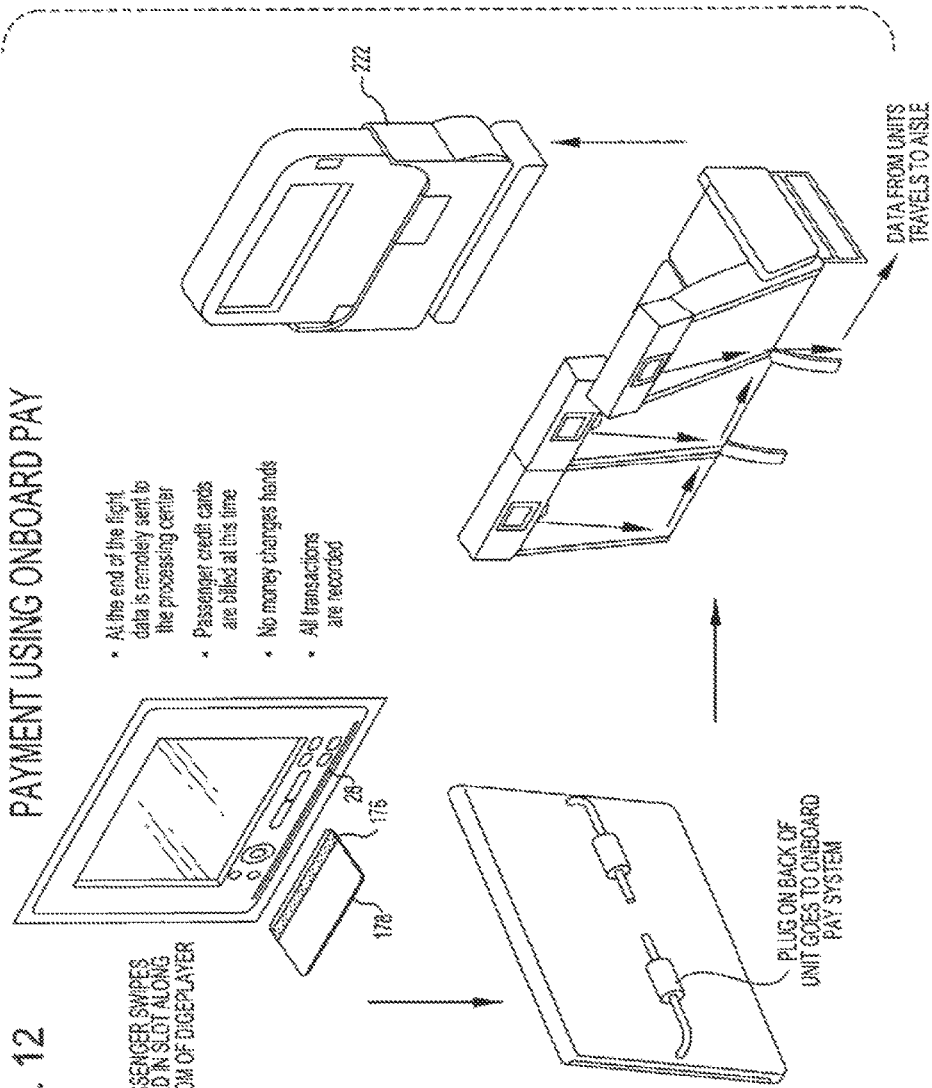

DETACHABLE SEAT MOUNTED AUDIO-VISUAL ENTERTAINMENT SYSTEM WITH LOCALLY STORABLE, SELECTABLE, AND UPDATABLE CONTENT

CROSS-REFERENCE TO RELATED APPLICATIONS

This application is a continuation of, and claims priority to and the benefit of, U.S. patent application Ser. No. 13/850,219 filed Mar. 25, 2013 and titled "DETACHABLE SEAT MOUNTED AUDIO-VISUAL ENTERTAINMENT SYSTEM WITH LOCALLY STORABLE, SELECTABLE, AND UPDATEABLE CONTENT" which is a continuation of U.S. Pat. No. 8,403,411, issued on Mar. 26, 2013, and titled "DETACHABLE SEAT MOUNTED AUDIO-VISUAL ENTERTAINMENT SYSTEM WITH LOCALLY STORABLE, SELECTABLE, AND UPDATABLE CONTENT," which patent is expressly incorporated herein in its entirety by this reference.

OTHER RELATED PATENT APPLICATIONS

This patent application describes a novel system for placing audio-visual entertainment systems in the hands of passengers on transport vessels, some aspects of which have been described in prior patent applications commonly owned herewith, namely: (a) U.S. patent application Ser. No. 10/657,823, filed Sep. 8, 2003, titled "MANAGEMENT METHOD OF IN-FLIGHT ENTERTAINMENT DEVICE RENTALS HAVING SELF-CONTAINED AUDIO-VISUAL PRESENTATIONS;" (b) U.S. Pat. No. 8,406,453, issued on Mar. 26, 2013, titled "SECURITY SYSTEM AND METHOD OF IN-FLIGHT ENTERTAINMENT DEVICE RENTALS HAVING SELF-CONTAINED AUDIOVISUAL PRESENTATIONS;" (c) U.S. patent application Ser. No. 10/657,816, filed Sep. 8, 2003, titled "PAYMENT METHOD FOR IN-FLIGHT ENTERTAINMENT DEVICE RENTALS HAVING SELF-CONTAINED AUDIO-VISUAL PRESENTATIONS;" and (d) U.S. Patent Application Express Mail Label No. EL976386875US, filed Sep. 8, 2003, titled "USER INTERFACEIMENUE SYSTEM FOR SELF CONTAINED IN-FLIGHT ENTERTAINMENT DEVICE;" the disclosures of each of which are incorporated herein in their entireties by this reference.

COPYRIGHT NOTIFICATION

Portions of the disclosure of this patent document contains material that is subject to copyright protection. The copyright owner has no objection to the facsimile reproduction by anyone of the patent document or the patent disclosure, as it appears in the files of the Patent and Trademark Office patent file or records, but otherwise reserves all copyright rights whatsoever.

TECHNICAL FIELD

This invention relates to the field of individualized entertainment devices for passengers on transport systems. In one aspect, the invention may be applied to passenger aircraft for in-flight movie and music rentals, and may be utilized in a method of generating revenues via on-board rental of such individualized entertainment devices.

BACKGROUND

Various equipment and systems have been attempted or employed over the years for providing entertainment to passengers seated in transport vessels such as aircraft. Some systems have provided overhead projection for everyone to watch the same movie. Some systems have provided in seat selectable channels to a commonly served multichannel audio entertainment computer or multi-media device. However, systems known to us have not provided sufficiently for individualized choices in movie or audio entertainment, nor have they provided easy methods for revenue generation therefrom.

Consequently, it would be desirable to provide a method for providing individually selectable audio-visual devices on board transport vehicles such as passenger aircraft, while simultaneously enabling the operator of the transport vehicle to collect revenue for thusly enabling the passenger to view the selected video or audio program. And, it would be desirable to provide a simple system that easily allows the operator of the transport device to update the audio-visual content available to the passenger. It would be especially desirable for such a system to make secure and simple revenue collection possible. Moreover, it would be desirable to provide a reliable apparatus that minimizes installation requirements, including retrofit of existing passenger seats on transport vessels, as well as reducing maintenance requirements, but which nevertheless allows easy and quick service to the components of the system so as to minimize labor requirements as well as to avoid delays to the operator when inevitable repairs to the system components become necessary. Thus, the important advantages of a novel, detachable, seat mounted, revenue-generating audio-visual entertainment system with locally storable, selectable, and updatable content, can be readily appreciated.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawings, wherein:

FIG. 3 is a partial cut-away perspective view, now showing the IFED just illustrated in FIG. 2 as installed on an existing aircraft seat, and showing the various components of the slip-over seat cover assembly, including the backing board, the mounting pan, the protective foam padding, the slip cover, and a passenger IFED terminal.

FIG. 4 provides another perspective view, similar to the view just shown in FIG. 3, but now showing in full the outward appearance, rather than a cut-away as is provided in FIG. 3.

FIG. 5 provides an exploded perspective view of the embodiment of the IFED illustrated in FIGS. 1 through 4, further illustrating the various components of the slipover seat cover assembly, including the backing board with through hole apertures for passage of communication cables to the passenger IFED terminal, the mounting pan also with through hole apertures for passage of communication cables to the passenger IFED terminal, the protective foam padding generally in the shape of a downwardly expanding wedge vertically and horizontally in the size and shape of the upper seatback, and the slip cover which is affixed to the existing upper seatback via suitable fasteners such as hook and loop type fastener strips, and a passenger IFED terminal.

FIG. 12 is a diagrammatic illustration of various element of one embodiment for generation of electronic revenue slips using an on-board pay system, wherein the payment interface device is a card swipe located along the bottom of the passenger IFED terminal, which terminal is hard wired via a local network or "data highway" to a transport vehicle host computing device which collects revenue slips generated during the flight for batch off-load after completion of a flight; alternately the passenger terminal may be connected to the host via a wireless local network.

Figure 1:
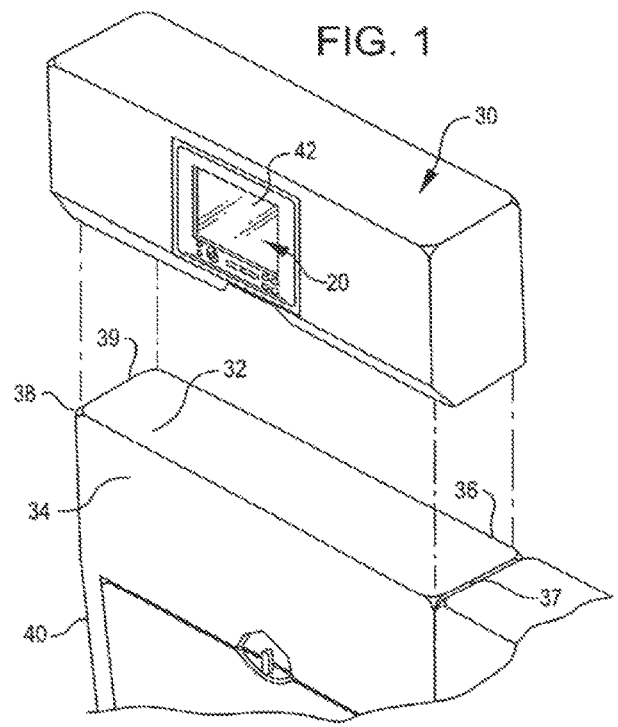
FIG. 1 shows a perspective view of one embodiment for a slip-over seat cover assembly for a passenger entertainment device, as might be configured for an "IFED" or in-flight entertainment device for placement over existing aircraft seats.

The foregoing figures, being merely exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements and parameters may be utilized to provide various optional features may be utilized in order to provide an efficient, reliable, easily installed and maintained passenger entertainment system for transport vehicles, and which can be utilized in a novel method for simple and reliable revenue collection method for rental viewing of audio-visual content.

DETAILED DESCRIPTION

We have now invented a detachable enclosure and seat mount for an audiovisual entertainment passenger terminal 20 with locally storable, selectable, and updatable content. In one embodiment, the passenger terminal may be utilized in passenger transport aircraft, and in such case, may be referred to as a passenger "in-flight entertainment device" or passenger IFED terminal, although more generally it may be used for other transport vehicles for example, train, bus, or hydrofoil or other boat transport, or even automobiles such as multi-passenger vans or taxi-cabs, any of which may have seats adaptable to use of the developments described herein. Generally, such a device can be considered to be "passenger terminal" 20 for an audio-visual entertainment system. The passenger terminal 20 (see FIG. 1) works in conjunction with a transport vehicle on-board host digital storage and processing computer unit 22 (see FIG. 8) to generate electronic revenue slip files from passengers 24 who pay for viewing personally selected audio-visual content such as movies from a list of movie titles, songs from a list of song titles and/or performers, or other audio-visual items, via payment interface device 26 such as a card swipe reader 28 (see FIG. 12).

Figure 2:
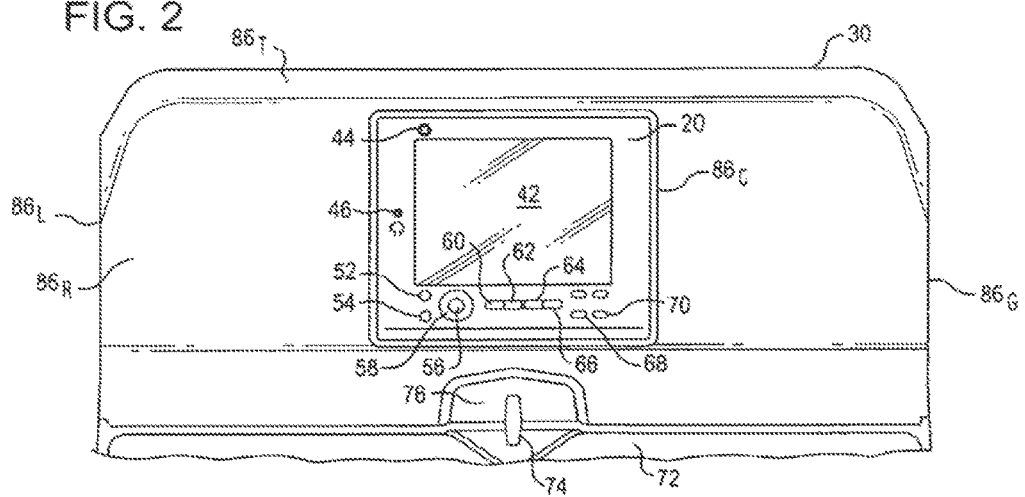
FIG. 2 provides horizontal view looking forward from a second seat toward an IFED of the configuration just illustrated in FIG. 1 as it appears after having been slipped over the existing seat back and affixed in a normal working location.

Returning now to FIG. 1, one suitable embodiment for a slip-over seat cover enclosure assembly 30 for a passenger terminal 20, as might be configured for an "IFED" or in-flight entertainment device, for example, a "digEplayer™ IFED as developed by Aircraft Protective Systems of Tacoma, Wash., is shown ready for attachment via the simple and quick method of placement of the enclosure assembly 30 over the upper end 32, the upper back portion 34, the upper front portion 36, and the right 37 and left 39 upper back portions of the back 38 of an existing aircraft seat 40. In FIG. 2, the enclosure assembly 30 just illustrated in FIG. 1 is now shown as it appears after having been slipped over the back 38 of existing aircraft seat 40 and releasably secured in a normal working location.

Figure 8:
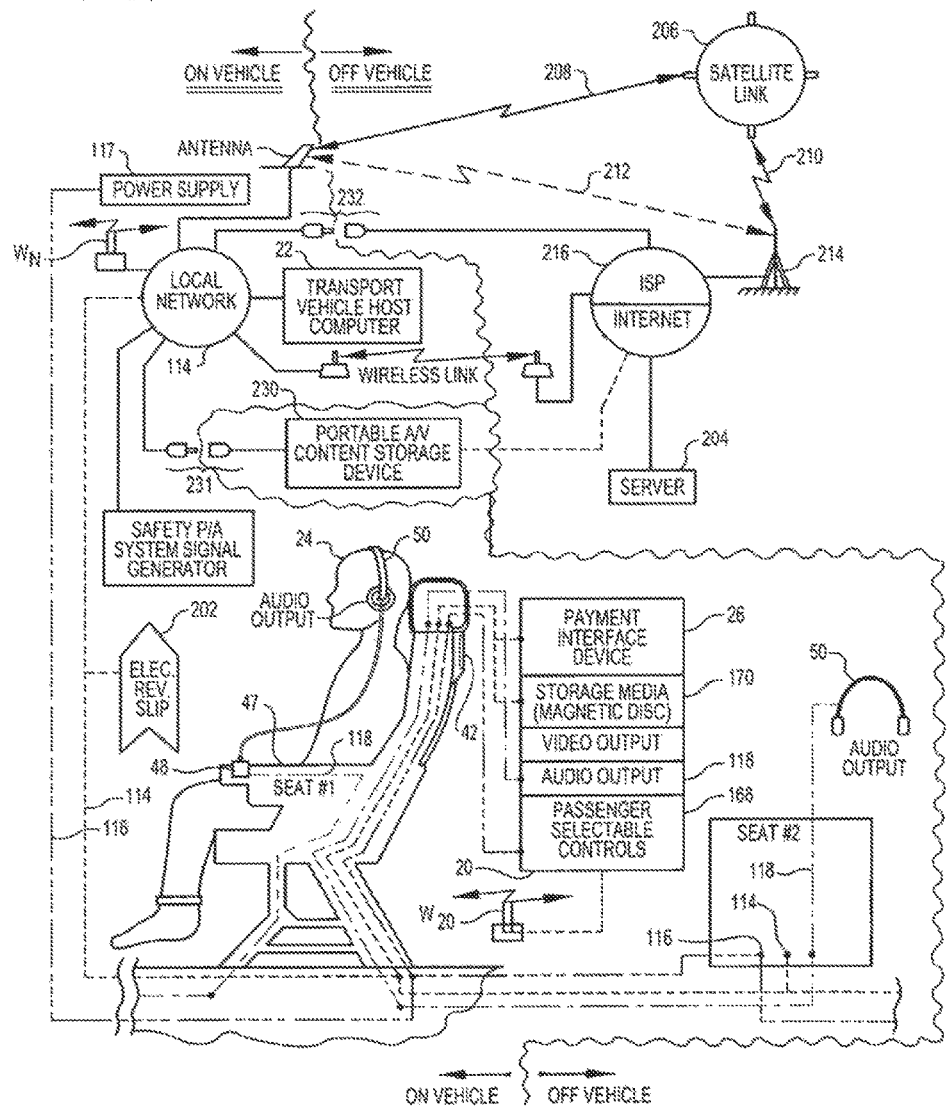
FIG. 8 provides a diagrammatic illustration of the various components of the detachable seat mounted audio-visual entertainment system with locally storable, selectable, and updatable content, showing the passenger IFED terminal with passenger selectable controls, a video display, an audio output, storage media such as a magnetic or "hard disk", and a payment interface device such as a card swipe, all located in a seat which has been wired with power, local network, and audio wiring (which audio may in some embodiments be provided via the local network) to the seat in which the user of the IFED is located (normally the next seat rearward). A local, transport vehicle mounted local host computer provides supports the local network, and may be used to collect revenue slips resulting from passenger input to the payment interface device. Revenue slips may be posted to a remote server during a trip segment via satellite or direct radio frequency communication to receiving facilities providing connection to the internet, or alternately collected and posted batch-wise, in such case may be performed by a portable device which is also used for uploading audio visual content to the local passenger IFED terminals.

Additional details of one embodiment of the digEplayer passenger IFED terminal 20 are evident in FIG. 2. For example, a liquid crystal display (LCD) screen 42 of a desired size, here a nominal five and one-half inch diagonal measure, may be provided. An on-off power button 44 can be utilized. Optional audio output jack 46 may be utilized, or, as shown in FIG. 8, an armrest 47 mounted audio output jack 48 may be utilized, for audio output to headphones 50 worn by passenger 24. Returning to FIG. 2, first 52 and second 54 menu buttons may be provided. A centrally located "select" button 56 is located adjacent a multi-directional "scroll" button 58. Stop 60, play/pause 62, review 64, and fast forward 66 buttons are provided in conventional DVD player fashion. A contrast up/down 68 button and a volume up/down 70 button are also provided. Also visible in this FIG. 2 are a seat tray 72 and tray lock 74, as well as tray lock stowage compartment 76, as normally found on existing commercial passenger aircraft seats 40.

Attention is now directed to FIG. 3 where a partial cut-away perspective view is provided, showing the passenger terminal 20 just illustrated in FIG. 2 as installed on an existing aircraft seat 40 utilizing a detachable slip-over seat cover enclosure assembly 30. Various components of the slip-over seat cover assembly 30 are now visible, including a backing board 80, a mounting pan 82, a piece of shaped protective foam padding 84, and the slip cover 86. The slip cover 86 may be manufactured in any suitable material, whether cloth, including a stretchable elastic material, or a more conventional and durable material such as leather. The slip cover 86 may be provided in any suitable shape designed to detachably affix the slip cover enclosure assembly 30 to the back 38 of seat 40. In one useful embodiment, slip cover 86 may be provided in a generally upside down U-shaped configuration when viewed in downward cross-section from front 90 to back 92 along line 6-6 as seen in this FIG. 3, or as similarly seen in the cross-sectional view depicted in FIG. 6. Fitting into the interior of the upside down U-shape dimension is the back 38 of existing seat 40. Thus, slip cover 86 has a forward portion 86F against which a passenger may rest his or her head, and a rearward portion 86R which is sized and shaped to provide an interior cutout portion 86c matching the dimensions of the perimeter opening provided rearwardly by pan 82. A right side portion 86G and a left side portion 86L are provided to match the front to back thickness of the existing seat back 30 plus the space required by the passenger terminal 20. A top portion 86T joins the forward portion 8 with the rearward portion 86R and the right side portion 86G with the left side portion 86L.

Turning now to FIG. 5, an exploded perspective view of the embodiment of the slip-over seat cover assembly 30 with passenger IFED terminal 20 as illustrated in FIGS. 1 through 4 is provided, now further illustrating the various components of the slip-over seat cover enclosure assembly 30. A mounting pan 82 is sized and shaped to receive, for mounting along a horizontal pivoting axis as indicated by centerline 100, the passenger IFED terminal 20. In one embodiment, pivot pins 102 and 104 may be provided in a configuration which work with companion tabs or pivot locks 106 and 108 on mounting pan 82 to provide rear access and detachment of IFED 20 through the mounting pan 82, so that the passenger IFED terminal may not be removed by a passenger 24 from the viewing or LCD screen 42 side of the passenger IFED terminal 20. The mounting pan 82 includes first 110 and second 112 apertures defined by edge wall portions to provide for passage of one or more cables, containing digital data highways and/or other pathways for various signals, such as computer local network 114 (wire or fiber optic), electrical power 116, and audio connections 118, as more generally indicated in FIG. 8. Similar passageways are allowed through the backing board 80 via through hole apertures 120 and 122 for passage of communication and power cables to the passenger IFED terminal 20.

Protective foam padding 84 is provided, in this embodiment, generally in the shape of a downwardly expanding wedge when examined in vertical cross-section, and when viewed from the rear, horizontally, as in FIG. 2 and in perspective in FIG. 5, in the size and shape of the upper back portion 34 of the back 38 of an existing aircraft seat 40. Thickness of the foam pad 84 can be one inch or more as necessary to provide passenger protection and as appropriate to shield the passenger terminal 20 and mounting pan 82. As noted in FIGS. 5 and 6, the slip cover 86 is affixed to the existing upper back portion 34, the upper front portion 36, and the upper right side 37 and upper left side 39 of the back 38 of an existing aircraft seat 40 via suitable fasteners such as hook and loop type fastener strips on the slip cover 86, namely fasteners 140c, 142c, 144c and 146c, which are releasably secured to complementary hook and loop portions 140s, 142s, 144s, and 146s which are affixed to seat 40. Optional fastener 147c may be utilized with companion fastener 149s. Hook and loop fastener may be provided utilizing Velcro® brand fastener portions. The overall effect is to provide a visually appealing slip cover, such as an easily maintainable leathers slip cover 86, which are easy to install and which are quickly and easily removable.

Figure 7:
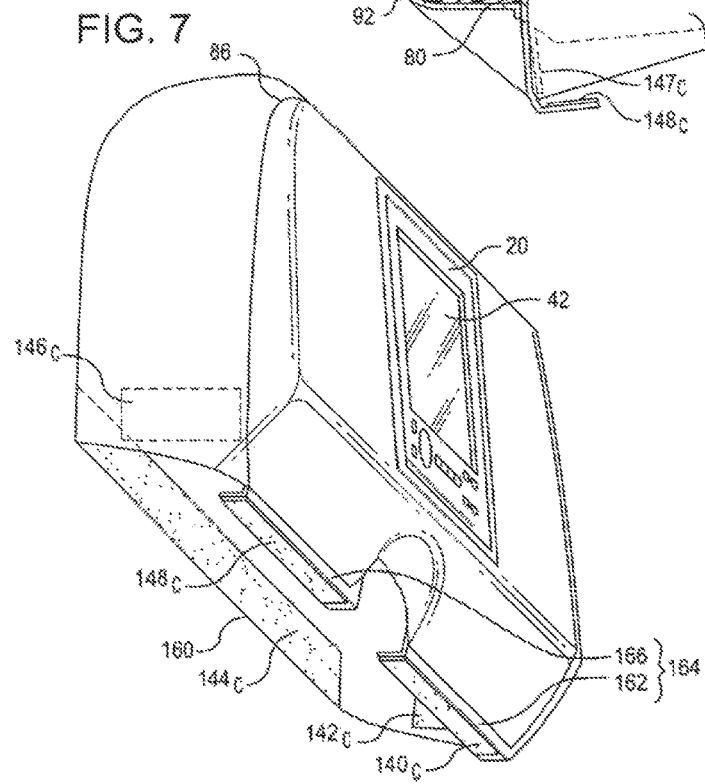
FIG. 7 is lower side perspective view of a slip-over seat cover assembly for a passenger entertainment device, as it appears before being slipped over an existing seat back, and further shows the use of (a) a first vertically oriented rectangular planar strip of hook and loop fastener to affix the forward lower end of the slip cover to an existing aircraft seat, (b) a second substantially horizontally oriented short rectangular planar strip of hook and loop fastener to affix a first side of the rear lower end of the slip cover to the seat back in a region immediately above a seat back tray, and (c) a third substantially horizontally oriented short rectangular planar strip of hook and loop fastener to affix a second side of the rear lower end of the slip cover to the seat back in a region immediately above a seat back tray.

In FIG. 7, a lower side perspective view of a slip-over seat cover enclosure assembly 30 is shown as it appears before being slipped over the back of an existing seat 40. Additional details are illustrated with respect to (a) a first vertically oriented rectangular planar strip of hook and loop fastener 144c to affix the forward lower end 160 of the slip cover to an existing aircraft seat, (b) a second substantially horizontally oriented short rectangular planar strip of hook and loop fastener 140c to affix a first side 162 of the rear lower end 164 of the slip cover to the seat back in a region immediately above a seat back tray, and (c) a third substantially horizontally oriented short rectangular planar strip of hook and loop fastener 148c to affix a second side 166 of the rear lower end 164 of the slip cover 86 to the seat back in a region immediately above a seat back tray.

Figure 6:
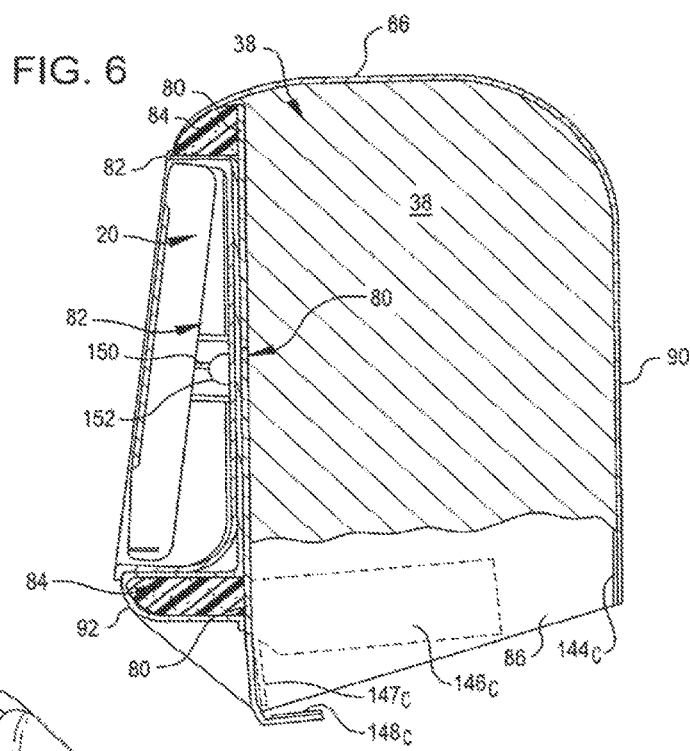
FIG. 6 provides a vertical cross-sectional view of the embodiment of the slipover seat cover assembly just illustrated in FIGS. 1-5 above, showing the backing board, the mounting pan, communication cables with connectors to the passenger IFED terminal, the protective foam padding, the slip cover affixed to the existing seat via fasteners such as hook and loop type fastener strips, and a passenger IFED terminal pivotally affixed with respect to the mounting pan.
Figure 9:
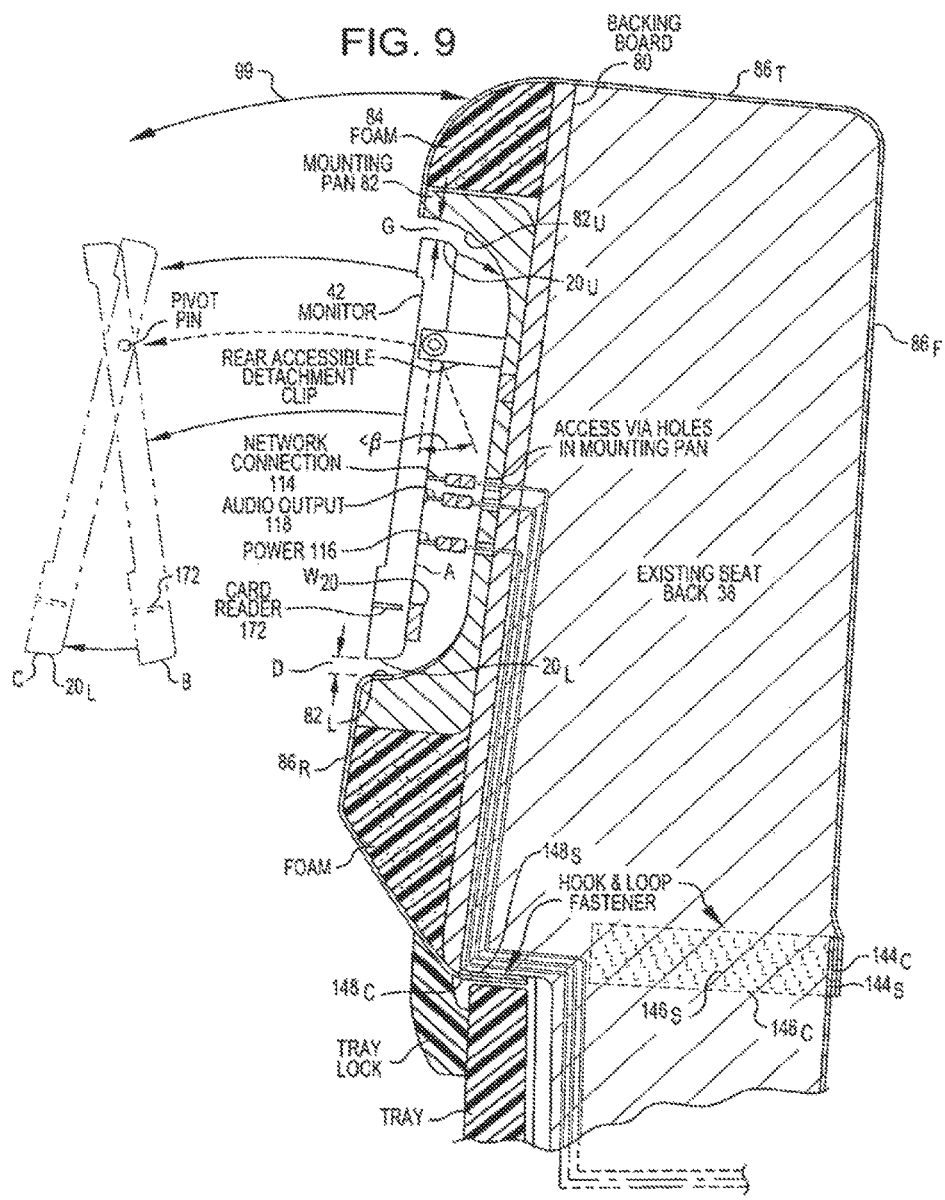
FIG. 9 provides a detailed cross-sectional view of a slip-over seat cover assembly similar to that illustrated in FIG. 6 above, showing the backing board, mounting pan, communication cables with connectors between the passenger IFED terminal and the local network, the power supply, and the audio output line, and showing the protective foam padding, the slip cover affixed to the existing upper seatback via suitable fasteners such as hook and loop type fastener strips, and further details of a passenger IFED terminal that pivots a sufficient angle beta ([3) to allow a passenger to select an optimum viewing angle, even when the seat back has been lowered angularly toward the passenger.
Figure 10:
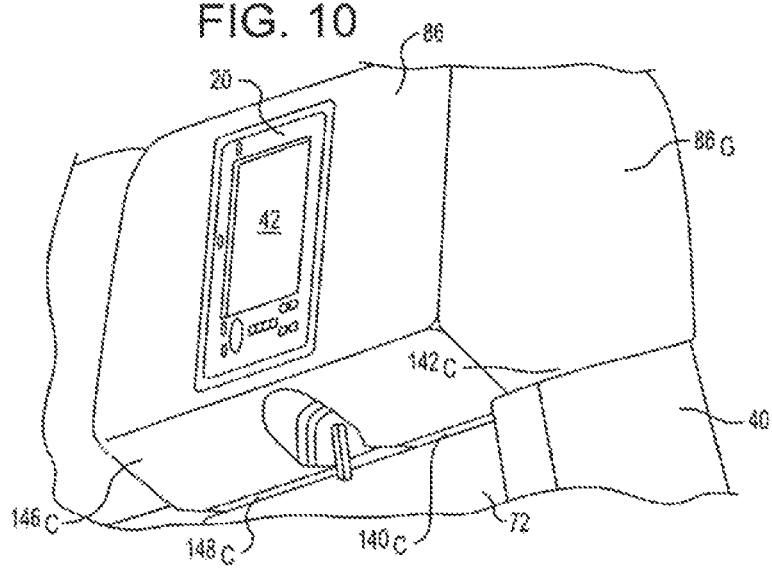
FIG. 10 provides another lower side perspective view, further illustrating the locations at which a hook and loop type fastener may be utilized for affixing the slip-over seat cover assembly to the existing seat back.
Figure 11:
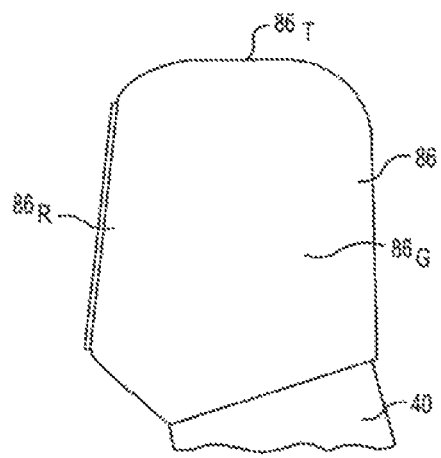
FIG. 11 provides a side elevation view of the cover just shown in FIG. 10, depicting the slip-over seat cover assembly when viewed from the side.

In FIGS. 6 and 9, slightly varying embodiments are provided, with both shown in a vertical cross-sectional view. In FIG. 6, the embodiment of the slip-over seat cover enclosure assembly 30 just illustrated in FIGS. 1-5 above is provided showing additional detail with respect to the backing board 80, the mounting pan 82, and communication cable 150, and a connector 152 to the passenger IFED terminal 20. Alternate or additional details are shown in FIG. 9, which provides a detailed vertical cross-sectional view of a slip-over seat cover enclosure assembly 30 similar to that just illustrated in the figures above, but now showing an embodiment wherein the mounting pan 82 has an upper radius portion 82u, and wherein said passenger terminal comprises an upper radiused surface 20u, and wherein the upper radius portion 82u of the mounting pan 82 and the upper radiused surface 20u of the passenger terminal 20 are mounted in a close fitting relationship spaced apart by a small gap G, wherein the small gap G is sufficiently small so that fingers of a passenger cannot reach through the gap therebetween, so as to attempt to remove the terminal 20. Likewise, the mounting pan 82 has a lower radius portion 82L, and the passenger terminal has a lower radiused surface 20L. The lower radius portion 82L of the mounting pan 82 and the lower radiused surface 20L of the passenger terminal 20 are mounted in a close fitting relationship spaced apart by a small gap D, and wherein the small gap D is sufficiently small so that fingers of a passenger cannot reach through the gap therebetween so as to attempt to remove the passenger IFED terminal 20.

Further details are indicated, specifically showing that the passenger IFED terminal 20 pivots a sufficient angle beta ((3) to allow a passenger to select an optimum viewing angle, even when the seat back has been lowered back toward the passenger, as indicated by the initial position of passenger terminal at A, and subsequent positions in hidden lines B, before tilting but after movement to seat 40 in the direction of reference arrow 99, and then again at position C shown in hidden lines after movement of the seat 40 backward and the tilt rearwardly of lower end 20L of the passenger terminal 20.

Attention is now directed to FIG. 8 which provides a diagrammatic illustration of the various components of the detachable seat mounted audio-visual entertainment system having a passenger terminal 20 with locally storable, selectable, and updatable content. The passenger IFED terminal 20 may have, in one embodiment, passenger selectable controls 168 as described above in relation to FIG. 2. A video display 42 is provided. A storage media 170 such as a magnetic or "hard disk" is provided in the passenger terminal 20 to store a variety of audio-visual content, for example, movies, music, or information, for selection by a passenger 24. A payment interface device 26 such as a card swipe reader 28 (see FIG. 12) for reading magnetic 176 or other digital medium from card 178 may be located at or in the passenger terminal 20. The seat may be wired with computer local network 114 (wire or fiber optic), electrical power 116, from power supply 117, and audio connections 118. Alternately, a wireless local network may be utilized, using communication devices WN at or near the local network hub, and communication device W 20 at each one of the passenger IFED terminals 20. Such a wireless network may be based on Blue Tooth protocol—which supports data, voice, and content-centric applications and which operates in the unlicensed 2.4 GHz radio spectrum using a spread spectrum, frequency hopping, full-duplex signal at up to 1600 hops/sec while utilizing signal hops among 79 frequencies at 1 MHz intervals to provide substantial interference immunity. Alternately, the wireless may be based on WiFi or other RF (radio frequency) enabled protocol, as appropriate in the circumstances. In such instance, only a power supply line 116 and local audio wiring 118 would be required. A local, transport vehicle mounted local host computer 22 provides supports the local network 114, and may be used to collect electronic revenue slips 202 resulting from passenger 24 input to the payment interface device 26. Electronic revenue slips 202 may be posted to a remote server 204 during a trip segment via satellite 206 uplink 208 and downlink 210 (and the reverse) or direct radio frequency communication 212 to receiving facilities 214 providing connection via internet service provider 216 to the internet. Alternately, the electronic revenue slips 202 can be collected and posted batch-wise, and in such case may be alternately performed by a portable device 230 which may also be used for uploading audio visual content to the local passenger IFED terminals 20.

Finally, attention is called to FIG. 12 which provides one diagrammatic illustration of various element of a possible embodiment for generation of electronic payment slips 202 using an on-board pay system, wherein the payment interface device 26 is a card swipe 28 located near the bottom 20L of the passenger IFED terminal 20. The terminal 20 may be hard wired via a local network 114 or "data highway" to the transport vehicle host computing device 222 which collects electronic revenue slips 202 generated during a trip (e.g., flight) for batch off-load after completion of the trip.

Thus, the combination of an existing aircraft seat 40 having an upper seat back portion 38, and a detachable enclosure 30 for housing a passenger terminal 20 for an inflight entertainment device system, is an important improvement in the state of the art. In such a configuration, the passenger terminal 20 may have one or more cables extending therefrom. As described herein above, the detachable enclosure 30 includes a backing board 80 having one or more apertures 120 and 122 therein for passage therethrough of one or more cables 150 extending from the passenger in-flight entertainment terminal 20. A mounting pan 82 is affixed to the backing board 80 and the mounting pan 82 has one or more apertures 110 and 112 therein for passage therethrough of one or more cables 150 extending from the passenger in-flight entertainment terminal 20. The mounting pan 82 is sized and shaped to pivotally secure thereto a selected passenger in-flight entertainment device terminal 20. A foam cushion 84 is mounted to the backing board in a matched relationship rearwardly from the backing board 80. The foam cushion 84 has an inner perimeter edge 84C confiningly surrounding the mounting pan 82 and providing padding adjacent thereto. A slip-on cover 86 is provided sized, shaped, and adapted to fit over a selected existing seat 40 upper seat back portion in a secure close fitting relationship. Affixed to the slip-on cover and to the upper seat back are one or more complementary hook and loop fastener portions to releasably secure the detachable enclosure to the upper seat back. As mentioned above, the complementary hook and loop fastener portions may be provided using Velcro® brand hook and loop fasteners. In one embodiment, the detachable enclosure is provided with a slip-on cover having a rear portion with first and second lower end portions, wherein the first and second lower end portions are adapted to straddle, in a spaced apart relationship, an existing tray table lock mount recess 76.

In one method for limiting losses to the operator of the transport vehicle, the when the transport vehicle is engaged in travel during use of said entertainment system, the electronic revenue data slips are posted to a remote server 204 during such travel. As a result, the validity of a payment method used by a passenger is verified during travel of the passenger transportation vehicle. In such a method it is possible that the electronic revenue data slips are posted individually as payment data is provided by a passenger. However, if instant communications are not available, then the passenger transportation vehicle may travel for period of time to complete one or more trip segments during use of the entertainment system, and then the electronic revenue data slips are posted to a remote server 204 after completion of a selected trip segment. In such case, a plurality of electronic revenue data slips 202 are posted in a batch to the remote server 204. In any event, the remote server 204, upon receipt of each electronic revenue data slip 202, performs a payment mode validity verification check, which validity verification check establishes the validity or the invalidity of the selected payment mode. In the instance with the remote server determines the invalidity of the payment mode, a further step of preventing start of, or the step of terminating the viewing of, the audio-visual content selected by the passenger may be included. Generally, the payment mode may be selected from amongst (a) credit cards, (b) debit cards, (c) direct funds transfer authorization, or other coded data format acceptable to a financial institution.

In one embodiment, the step of updating audio visual content stored on the first storage medium in anyone of a plurality of the passenger terminals 20 is achieved by providing a portable content storage device, and connecting the portable content storage device to the local network, and then directly downloading new audio-visual content to one or more of the passenger terminals. In one embodiment, the step of updating audio visual content stored on a plurality of said passenger terminals is performed batch-wise, so that a plurality of passenger terminals are updated with new audio visual content simultaneously. Often, when a passenger transport vehicle comprises multiple seats occurring in multiple rows, then a selected number of rows are updated simultaneously. For example, groups of five rows may be updated simultaneously in some types of aircraft seating configurations, where each row of seats comprises a group of up to six seats. In one example, a selected number of passenger terminals in a selected transport vehicle are updated in about thirty minutes or less. In some transport vehicles, all passenger terminals in a selected transport vehicle are updated in about thirty minutes or less. In still other combinations of seating configurations and portable content storage devices, all passenger terminals in a selected transport vehicle are updated in about fifteen minutes or less. Similarly, in other situations, all passenger terminals in a selected transport vehicle are updated in about twelve minutes or less. In yet another example, all passenger terminals in a selected transport vehicle are updated in about ten minutes or less.

Generally, the first storage medium used in each of the passenger terminals 20 may include a drive adapted to hold a magnetic medium. More specifically, the magnetic medium currently is conventionally configured as a magnetic disk.

For safety reasons, if should be appreciated that in some configurations, particularly in the case of passenger transport aircraft, a selected passenger in-flight entertainment system must include an interface with a safety and public address system, so that an appropriate audio signal is generated by a suitable signal generator which is operatively connected to the local network and thence to each of said passenger terminals to provide direct, real time audio communication with each passenger using a passenger terminal, for use with appropriate safety and emergency announcements.

It is to be appreciated that the various aspects and embodiments of a slip-on slip cover design for providing a passenger entertainment device, especially as may be applied for passenger aircraft, is an important improvement in the state of the art of passenger in-flight entertainment devices. Although only a few exemplary embodiments have been described in detail, various details are sufficiently set forth in the drawings and in the specification provided herein to enable one of ordinary skill in the art to make and use the invention(s), which need not be further described by additional writing in this detailed description. Importantly, the aspects and embodiments described and herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. This disclosure is intended to cover the structures described herein and not only structural equivalents thereof, but also equivalent structures. Numerous modifications and variations are possible in light of the above teachings. It is therefore to be understood that the invention(s) may be practiced otherwise than as specifically described herein. Thus, the scope of the invention(s), as set forth in the following claims, as well as in the drawing and by the foregoing description, is intended to include variations from the embodiments provided which are nevertheless described by the broad interpretation and range properly afforded to the plain meaning of the language of the claims provided herein.

The invention claimed is:

1. A detachable aircraft seat cover assembly unit having an in-flight entertainment device, comprising:
a detachable slip cover for an aircraft passenger seat, the slip cover incorporating the in-flight entertainment device that comprises all of:
a video display;
passenger selectable controls;
a memory device, unique to the aircraft passenger seat, used to store personally-selectable entertainment media; and
a communication link in the slip cover of each seat for communicating with a network hosting device local to the aircraft, which network hosting device communicates with receiving facilities off of the aircraft, the communication link to:
communicate between the memory device of the aircraft passenger seat and a host storage device, the host storage device being part of the network hosting device;
download entertainment media from the host storage device on the aircraft to the in-flight entertainment device and simultaneously to other in-flight entertainment devices;
store the entertainment media locally at the passenger seat on the memory device; and
transmit, in flight, revenue slips relating to purchased media content to a remote server on the ground via the network hosting device local to the aircraft.

2. The seat cover assembly unit of claim 1, wherein the in-flight entertainment device includes a payment interface.

3. The seat cover assembly unit of claim 2, wherein the payment interface includes a card swipe reader.

4. The seat cover assembly unit of claim 1, wherein the in-flight entertainment device is configured to communicate with the local network through a wireless link of the communication link.

5. The seat cover assembly unit of claim 1, further comprising an audio output jack.

6. The seat cover assembly unit of claim 1, wherein the video display is attached to a support backing with a pivot pin, wherein the pivot pin allows the video display to rotate.

7. The seat cover assembly unit of claim 1, wherein the slip cover further comprises:
a detachable enclosure;
a backing board having one or more apertures to allow for cables extending from the in-flight entertainment device;
a mounting pan affixed to the backing board, wherein the mounting pan is sized and shaped to secure to a in-flight entertainment device; and
a foam cushion attached to the backing board.

8. The seat cover assembly unit of claim 1, wherein the communication link conforms to at least one protocol selected from:
a wireless protocol;
a radio frequency protocol; and
a 2.4 GHz radio spectrum using spread spectrum, frequency hopping, full-duplex signal at up to 1600 hops/sec.

9. An in-flight passenger entertainment system for an aircraft, comprising:
 a plurality of aircraft passenger seats;
 a detachable seat cover assembly unit associated with each aircraft passenger seat; and
 an in-flight entertainment device located on each seat cover assembly unit, each in-flight entertainment device having:
  (i) passenger selectable controls,
  (ii) a memory device unique to the aircraft passenger seat to store personally-selectable entertainment media, and
  (iii) a local network communication link configured to:
   communicate between the in-flight entertainment device and;
    a network hosting device local to the aircraft, which network hosting device communicates with receiving facilities off the aircraft; and
    a host storage device that is part of the network hosting device;
   download entertainment media from the host storage device on the aircraft to the in-flight entertainment devices of each aircraft passenger seat;
   store the entertainment media locally at the passenger seat on the memory device of the corresponding in-flight entertainment device; and
   transmit, in flight, revenue slips relating to purchased media content to a remote server on the ground via the network hosting device local to the aircraft.

10. The passenger entertainment system of claim 9, wherein the host storage device is configured to:
 store audio-visual content, including entertainment media including movies and music; and
 update video content stored locally on each of the in-flight entertainment devices via the local network, wherein each memory device associated with an in-flight entertainment device is configured to locally store entertainment media, and each in-flight entertainment device is configured to allow the passenger to select from the locally-stored content.

11. The passenger entertainment system of claim 9, wherein each local network communication link comprises a wireless link.

12. The passenger entertainment system of claim 9, wherein the host storage device comprises a host computer which is configured to:
 select a certain batch of passenger terminals; and
 update the entertainment media stored on the memory devices associated with the selected batch of in-flight entertainment devices simultaneously.

13. The passenger entertainment system of claim 9, wherein each in-flight entertainment device includes a payment interface.

14. An in-flight passenger entertainment system, the system comprising:
 a first aircraft passenger seat and a first detachable slip-over seat cover assembly unit including a first in-flight entertainment device comprising all of:
  a first video display,
  first passenger selectable controls,
  a first memory device unique to the first aircraft passenger seat, and
  a first communication link for communicating with a network hosting device local to the aircraft, which network hosting device communicates with receiving facilities off of the aircraft, the first communication link to:
   communicate between the first memory device of the first aircraft passenger seat and a host storage device, the host storage device being part of the network hosting device;
   download entertainment media from the host storage device on the aircraft to the first in-flight entertainment device and simultaneously to other in-flight entertainment devices;
   store the entertainment media locally at the first aircraft passenger seat on the first memory device; and
   transmit, in flight, revenue slips relating to purchased media content to a remote server on the ground via the network hosting device local to the aircraft; and
 a second aircraft passenger seat and a second detachable slip-over seat cover assembly unit including a second in-flight entertainment device comprising all of:
  a second video display,
  second passenger selectable controls,
  a second memory device unique to the second aircraft passenger seat, and
  a second communication link for communicating with the network hosting device local to the aircraft, the second communication link to:
   communicate between the second memory device of the second aircraft passenger seat and the host storage device;
   download entertainment media from the host storage device on the aircraft to the second in-flight entertainment device and simultaneously to other in-flight entertainment devices;
   store the entertainment media locally at the second aircraft passenger seat on the second memory device; and
   transmit, in flight, revenue slips relating to purchased media content to the remote server; and
 a host storage device configured to use the local network for communication with the in-flight entertainment devices, wherein the host storage device is configured to update video content stored on the first and second in-flight entertainment devices via the local network by directly downloading the updated content onto the memory device of the first and second in-flight entertainment devices.

15. The system of claim 14, wherein the first and second in-flight entertainment devices are configured to:
 communicate with the local network through a wired or wireless link;
 be updated simultaneously with media contained in the host storage device via the local network, wherein the updated media is stored locally on the memory device of the in-flight entertainment device and includes entertainment media; and
 allow a passenger to select from the updated content.

16. The system of claim 14, further comprising a host computer connected to and configured to support the local network.

17. The system of claim 14, wherein the first and second in-flight entertainment devices include a payment interface.

18. The system of claim 16, wherein the host computer is connected to the local network and configured to collect electronic revenue slips resulting from passenger inputs to one or more of the payment interfaces.

19. The system of claim 14, wherein the host storage device is portable.

20. The seat cover assembly unit of claim 1, further comprising fasteners to allow the seat cover assembly unit to be installed onto and detached from an existing passenger seat.

21. A method for revenue collection in an aircraft entertainment system comprising a local network for communication between a remote server and a host computer that is supporting a plurality of in-flight entertainment devices, wherein each in-flight entertainment device comprises:
   a video display;
   a local memory device;
   a payment interface; and
   an interface with the host computer;
the method comprising, with the host computer performing all of:
   collecting revenue slips from the in-flight entertainment devices;
   holding in storage a batch of revenue slips when the local network is inoperative; and
   transmitting the batch of revenue slips to the remote server when the local network become available.

22. The method of claim 21, further comprising:
   with the remote server, performing a validity check on a payment method indicated by each revenue slip received.

23. The method of claim 21, wherein the payment interface further comprises a card reader.

24. The method of claim 21, wherein the host computer and in-flight entertainment devices are configured to communicate with the local network through a wireless link.

25. The method of claim 21, wherein the host computer is portable.

* * * * *